United States Patent [19]

Pasternak

[11] Patent Number: 5,234,579
[45] Date of Patent: Aug. 10, 1993

[54] MEMBRANE PROCESS FOR TREATING A CHARGE CONTAINING DEWAXING SOLVENT AND DEWAXED OIL

[75] Inventor: Mordechai Pasternak, Spring Valley, N.Y.

[73] Assignee: Texaco Inc., White Plains, N.Y.

[21] Appl. No.: 671,250

[22] Filed: Mar. 19, 1991

[51] Int. Cl.$^5$ .................. C07C 7/144; B01D 71/06; B01D 71/26; B01D 61/00
[52] U.S. Cl. .................. 208/308; 585/818; 585/819; 210/500.27; 210/500.36; 210/638; 210/651
[58] Field of Search ........... 585/818, 819; 208/308; 210/500.27, 500.36, 638, 651

[56] References Cited

U.S. PATENT DOCUMENTS

| | | | |
|---|---|---|---|
| 4,885,096 | 12/1989 | Black | 210/640 |
| 4,985,138 | 1/1991 | Pasternak | 208/308 |

Primary Examiner—Theodore Morris
Assistant Examiner—P. L. Hailey
Attorney, Agent, or Firm—James J. O'Loughlin; Carl G. Seutter

[57] ABSTRACT

Dewaxed oil containing dewaxing solvent from solvent dewaxing is treated by contact with a separating elastomer membrane to yield a retentate containing increased content of dewaxed oil and decreased content of dewaxing solvent and a permeate which contains increased content of dewaxing solvent and decreased content of dewaxed oil—the membrane including a barrier layer of an adduct of maleic acid anhydride and a poly(aliphatic terpene) which has been thermally cross-linked.

9 Claims, No Drawings

MEMBRANE PROCESS FOR TREATING A CHARGE CONTAINING DEWAXING SOLVENT AND DEWAXED OIL

FIELD OF THE INVENTION

This invention relates to a membrane process for treating a charge containing dewaxing solvent and dewaxed oil. More particularly it relates to use of membrane technology to separate dewaxing solvent from dewaxed oil.

BACKGROUND OF THE INVENTION

As is well known to those skilled in the art, hydrocarbon stocks used for the preparation of lubricating oil contain undesirable components which are removed during processing to permit attainment of a product which is characterized by desired properties. Typically a charge stock is subjected inter alia to a dewaxing operation which decreases the wax content and desirably lowers the pour point and the cloud point of the lubricating oil stock.

Dewaxing may be effected by mixing a dewaxing solvent, such as methyl ethyl ketone or methyl isobutyl ketone preferably in the presence of a hydrocarbon such as toluene or xylene, with the charge oil and cooling the mixture below the desired pour point, typically to minus 5° F.–minus 20° F., say minus 10° F., at which point wax precipitates. The wax is filtered; and the dewaxed oil—dewaxing solvent mixture is recovered.

This recovered mixture has classically been flashed to recover solvent-free lubricating oil stock and solvent which is free of lubricating oil.

Those skilled in the art have attempted to improve the economics of this process by utilizing membrane technology to separate dewaxing solvent from dewaxed oil. Illustrative of background prior art may be the following:

U.S. Pat. No. 4,678,555 to Wernick discloses use of cellulose acetate membranes.

European Patent Application 0 125 907 A1 to Wight discloses use of a polyimide membrane containing —CO—N—linkages.

European Patent Application 0 220 753 A1 to Bitter et al discloses use of a halogen-substituted silicone membrane.

U.S. Pat. No. 4,617,126 to Funk et al discloses use of a polysulfone membrane.

U.S. Pat. No. 4,985,138 to Pasternak discloses a cross-linked polyimine membrane.

Additional background may be obtained from the references set forth in these patents.

It is an object of this invention to provide a process for treating a charge containing dewaxing solvent and dewaxed oil. Other objects will be apparent to those skilled in the art.

STATEMENT OF THE INVENTION

In accordance with certain of its aspects, this invention is directed to a process for treating a charge containing dewaxing solvent and dewaxed oil which comprises passing said charge containing dewaxing solvent and dewaxed oil into contact with, as separating membrane, a non-porous separating elastomer membrane layer of an adduct of (i) a poly(aliphatic terpene) of $\overline{M}_n$ of 400–40,000 as and (ii) as functionalizing reagent, a compound containing an ethylenically unsaturated double bond and a hydrophilic group, the so-functionalized membrane layer being thereafter thermally cross-linked at 110° C.–150° C.;

maintaining a pressure drop across said membrane thereby forming a high pressure retentate containing increased content of dewaxed oil and decreased content of dewaxing solvent and a low pressure permeate containing increased content of dewaxing solvent and decreased content of dewaxed oil;

maintaining the pressure on the low pressure discharge side of said membrane above the vapor pressure of said permeate thereby maintaining said permeate in liquid phase;

maintaining the pressure on the high pressure retentate side of said membrane above the vapor pressure of said charge containing dewaxing solvent and dewaxed oil and sufficient to drive permeate across said membrane thereby maintaining said charge dewaxing solvent and dewaxed oil and said retentate in liquid phase;

recovering said permeate containing increased content of dewaxing solvent and decreased content of dewaxed oil; and recovering said retentate containing increased content of dewaxed oil and decreased content of dewaxing solvent.

DESCRIPTION OF THE INVENTION

The lube oil stocks which may be treated by dewaxing may include distillate stocks, deasphalted oils, raffinates from solvent extraction of distillate, hydrotreated oils, hydrocracked distillates, etc, ranging in viscosity at 100° F. from about 30 SUS to 4000 SUS. Typically such a charge may be characterized by the following:

TABLE

| Property | Range | Preferred | Typical |
|---|---|---|---|
| ibp °F. | 590–900 | 600–800 | 675 |
| 50% bp °F. | 725–1100 | 800–900 | 850 |
| 90% bp °F. | 800–1350 | 850–950 | 920 |
| Viscosity | | | |
| SUS/100° F. | 35–3500 | 40–100 | 54.6 |
| 60° F. | 50–10,000 | 100–400 | 48.7 |
| API Gravity | 20–30 | 22–29 | 25.8 |
| Sp. Gr 15° C./15° C. | 0.870–0.895 | 0.800–0.890 | 0.890 |
| Pour point °F. | 90–125 | 95–110 | 95+ |
| Flash Point °F. | 360–600 | 385–560 | 460 |
| Refractive Index @ 70° C. | 1.4720–1.4940 | 1.4755–1.4920 | 1.4840 |

This waxy oil charge (100 volumes) is mixed with 100–1000 volumes, preferably 200–500 volumes, say 300 volumes (depending on the viscosity grade and wax content of the feedstock) of ketone dewaxing solvent—such as acetone or preferably methyl ethyl ketone or methyl isobutyl ketone preferably diluted with a hydrocarbon solvent to produce dewaxing solvent. In a preferred embodiment, there may be added to 100 volumes of waxy oil charge, dewaxing solvent containing 50–75 volumes of ketone such as methyl ethyl ketone plus 50–25 volumes of a hydrocarbon solvent such as toluene or xylene. The mixture is cooled to minus 5° F.–minus 20° F., say minus 10° F. during which cooling, solid wax precipitates from the waxy oil charge. Typically a midcontinent distillate may be cooled to minus 10° F. to obtain a 0° F. pour point 100 neutral oil. Wax is filtered in a rotary vacuum filter to yield a dewaxed oil filtrate.

In accordance with practice of the process of this invention, this filtrate, containing dewaxing solvent and dewaxed oil, is passed into contact with, as a separating membrane, a non-porous separating elastomer membrane layer of an adduct of (i) a poly(aliphatic terpene) of $\overline{M}_n$ of 400–40,000 and (ii) as functionalizing reagent, a compound containing an ethylenically unsaturated double bond and which compound bears a hydrophilic group, the so-functionalized membrane layer being thereafter thermally cross-linked at 110° C.–150° C.

THE MEMBRANE ASSEMBLY

Practice of the process of this invention may be carried out by use of a composite structure which in one preferred embodiment may include (i) a carrier layer which provides mechanical strength, (ii) a porous support layer, and (iii) a separating elastomer layer across which separation occurs.

The composite structure of this invention includes a multi-layer assembly which in the preferred embodiment preferably includes a porous carrier layer which provides mechanical strength and support to the assembly.

THE CARRIER LAYER

This carrier layer, when used, is characterized by its high degree of porosity and mechanical strength. It may be fibrous or non-fibrous, woven or non-woven. In the preferred embodiment, the carrier layer may be a porous, flexible, woven fibrous polyester. A typical polyester carrier layer may be formulated of non-woven, thermally-bonded strands.

THE POROUS SUPPORT LAYER

The porous support layer (typically an ultra-filtration membrane) which may be used in practice of this invention is preferably formed of polyacrylonitrile polymer. typically the polyacrylonitrile may be of thickness of 40–80 microns, say 50 microns and is preferably characterized by a pore size of less than about 500 A and typically about 200 A. This corresponds to a molecular weight cut-off of less than about 50,000, typically about 40,000.

THE SEPARATING LAYER

The separating elastomer layer which permits attainment of separation in accordance with the process of this invention includes a non-porous film or membrane of 1–5 microns, say about 1.5 microns of an adduct of (i) a poly(aliphatic terpene) of molecular weight $\overline{M}_n$ of 400–40,000, preferably 400–4,000 say about 800 and (ii) as functionalizing reagent, a compound containing an ethylenically unsaturated double bond and a hydrophilic group, the so functionalized membrane layer being thereafter and thermally cross-linked.

The monomeric aliphatic terpenes which may be employed to form the elastomers useful in practice of this invention may include aliphatic terpenes such as hemiterpenes ($C_5H_8$), monoterpenes ($C_{10}H_{16}$), sesquiterpenes ($C_{15}H_{24}$), diterpenes ($C_{20}H_{32}$), etc. which may bear inert pendant groups. Typical aliphatic hemiterpenes include isoprene ($C_5H_8$). Typical aliphatic monoterpenes $C_{10}H_{16}$ include myrcene, alloöcimene, ocimene, etc. Typical aliphatic sesquiterpenes may include alpha-farnesene, etc. Squalene ($C_{30}H_{48}$) may be employed.

These aliphatic terpenes are all characterized by the presence of so-called isoprene units which contain the five-carbon 2-methyl butane (isopentane) structure which is found in isoprene. The monomers may contain at least one double bond, but more typically two (as in isoprene) or three (as in myrcene or alloöcimene). They may also bear inert pendant groups—but commonly they do not.

The aliphatic terpenes may be commercially available as oligomers and polymer of molecular weight $\overline{M}_n$ of 400–40,000, preferably 400–4,000, say 800.

The terpene polymer is functionalized thermally or photochemically prior to casting with, as functionalizing reagent, a compound containing an ethylenically unsaturated double bond and a hydrophilic group such as a — COOH, —CONH$_2$, —CN, —NH$_2$, anhydride, imide, etc. A preferred hydrophilic group may be the acid anhydride group. The preferred of such functionalizing regents is maleic acid anhydride. Others may include:

| TABLE |
|---|
| maleimide |
| maleic acid |
| maleic mono-amide |
| maleic di-amide |
| vinyl acetate |
| methyl acrylate |
| acrylonitrile |
| allyl amine |

A typically commercially available functionalized terpene polymer adduct may be the adduct of (i) maleic acid anhydride (0.25 moles) and (ii) one mole of poly (alloöcimene) of molecular weight $\overline{M}_n$ of about 800 available from Union Camp Corporation under the trademark PAO-800-MA-20.

The cast functionalized membrane of this invention, as a non-porous film of 1–5 microns, say 1:5 microns thickness, is heat treated at 100° C. 150° C., preferably, 120° C– 130° C., say 125° C. for 10–20 minutes, say 15 minutes—to effect thermal cross-linking.

THE COMPOSITE MEMBRANE

It is a feature of this invention that it may utilize a composite membrane which comprises (i) a carrier layer characterized by mechanical strength, for supporting a porous support layer and a separating layer (ii) a porous support layer such as a polyacrylonitrile membrane of 10–80 microns, and of molecular weight cutoff of 25,000–100,000, and (iii) as a non-porous separating elastomer membrane layer an adduct of (i) a poly(aliphatic terpene) of molecular weight $\overline{M}_n$ of 400–40,000 and (ii) as functionalizing reagent, a compound containing an ethylenically unsaturated double bond and a hydrophilic group, the so-functionalized membrane layer being thereafter thermally cross-linked at 110° C.–150° C., say 125° C for 10–20 minutes, say 15 minutes.

It is possible to utilize a spiral wound module which includes a non-porous separating layer membrane mounted on a porous support layer and a carrier layer, the assembly being typically folded and bonded or sealed along all the edges but an open edge—to form a bag-like unit which preferably has the separating layer on the outside. A cloth spacer, serving as the permeate or discharge channel is placed within the bag-like unit. The discharge channel projects from the open end of the unit.

There then placed on one face of the bag-like unit, adjacent to the separating layer, and coterminous therewith, a feed channel sheet—typically formed of a plastic net.

The so-formed assembly is wrapped around a preferably cylindrical conduit which bears a plurality of perforations in the wall—preferably in a linear array which is as long as the width of the bag-like unit. The projecting portion of the discharge channel of the bag-like unit is placed over the perforations of the conduit; and the bag-like unit is wrapped around the conduit to form a spiral wound configuration. It will be apparent that, although only one feed channel is present, the single feed channel in the wound assembly will be adjacent to two faces of the membrane layer. The spiral wound configuration may be formed by wrapping the assembly around the conduit a plurality of times to form a readily handleable unit. The unit is fitted within a shell (in manner comparable to a shell-and-tube heat exchanger) provided with an inlet at one end and an outlet at the other. A baffle-like seal between the inner surface of the shell and the outer surface of the spiral-wound unit prevents fluid from bypassing the operative membrane system and insures that fluid enters the system principally at one end. The permeate passes from the feed channel, into contact with the separating layer and thence therethrough, into the permeate channel and thence therealong to and through the perforations in the conduit through which it is withdrawn as net permeate.

In use of the spiral wound membrane, charge liquid is permitted to pass through the plastic net which serves as a feed channel and thence into contact with the non-porous separating membrane. The liquid which does not pass through the membrane is withdrawn as retentate. The liquid which permeates the membrane passes into the volume occupied by the permeate spacer and through this permeate channel to the perforations in the cylindrical conduit through which it is withdrawn from the system.

In another embodiment, it is possible to utilize the system of this invention as a tubular or hollow fibre. In this embodiment, the polyacrylonitrile porous support layer may be extruded as a fine tube with a wall thickness of typically 0.001-0.1 mm. The extruded tubes are passed through a bath of a solution of the adduct of poly(aliphatic terpene) bearing a hydropholic moiety which, and are then thermally cross-linked. A bundle of these tubes is secured (with epoxy adhesive) at each end in a header; and the fibres are cut so that they are flush with the ends of the header. This tube bundle is mounted within a shell in a typical shell-and-tube assembly.

In operation, the charge liquid is typically admitted to the tube side and passes through the inside of the tubes and exits as retentate. During passage through the tubes, permeate passes through the non-porous separating layer and permeate is collected in the shell side.

PRESSURE DRIVEN PROCESS

It is a feature of the non-porous cross-linked separating layer that it is found to be particularly effective when used in a pressure driven process. In a pressure driven process, a charge liquid containing a more permeable and a less permeable component is maintained in contact with a non-porous separating layer; and a pressure drop is maintained across that layer. A portion of the charge liquid dissolves into the membrane and diffuses therethrough. The permeate passes through the membrane and exits as a liquid.

In practice of the process of this invention, the charge containing dewaxing solvent and dewaxed oil in liquid phase typically at 20° C.-40° C., say 25° C. may be passed into contact with the non-porous separating layer of the membrane of this invention. A pressure drop of about 500-1000 psi, say 800 psi is commonly maintained across the membrane. The feed or charge side of the membrane is at pressure sufficient to drive permeate across the membrane and commonly about 800 psig; and the permeate or discharge side of the membrane is at about atmospheric pressure. The feed is passed over the surface (ca three inches in diameter in one embodiment) of the membrane at a rate (e.g. of about 1200 ml/min) which minimizes the possibility of concentration polarization.

The permeate which passes through the membrane includes increased content of dewaxing solvent and decreased content of dewaxed oil; and the retentate includes increased content of dewaxed oil and decreased content of dewaxing solvent.

Typically the charge to the membrane contains (per 100 parts of oil) 100-1100, preferably 200-600 parts, say 200 parts of dewaxing solvent. The permeate may typically be found to contain 96w% of dewaxing solvent.

Permeate is recovered in liquid phase.

Separation may typically be carried out at a flux as high as 40-60, say about 58 kilograms per square meter per hour kmh. Typically the units may have a Separation (Rejection) of as high as 70%-90% and commonly 80%-90%, say 87.2%.

Rejection % =

$$\frac{(\text{Feed Concentration} - \text{Permeate Concentration})}{\text{Feed Concentration.}} \times 100$$

Practice of the process of this invention will be apparent to those skilled in the art from the following examples wherein, as elsewhere in this specification, all parts are parts by weight unless otherwise stated.

DESCRIPTION OF SPECIFIC EMBODIMENTS

Example I

In this example which represents the best mode presently known of carrying out the process of this invention, the carrier layer is the woven polyester backing described supra. The porous support layer is the commercially available DUY-L brand of polyacrylonitrile (PAN) produced by Diacel Japan having a 40,000 molecular weight cut off.

The poly(aliphatic terpene) separating layer is fabricated by depositing a 2-mil layer of hexane solution containing 10w% of the adduct of maleic acid anhydride (20 mole %) and poly (alloöcimene) i.e. poly 2,6-dimethyl-2,4,6-octatriene, a terpene of formula $C_{10}H_{16}$—the polymer corresponding to $(C_{10}H_{16})_x$ where is about 5.9; and the molecular weight $\overline{M}_n$ is about 800—available from Union Camp Corporation under the trademark PAO-800-MA-20. The poly (alloöcimene) adduct in solvent hexane is spread over the polyacrylonitrile support layer to form a uniform film.

The membrane assembly is then cured i.e. thermally cross-linked at 125° C. for 15 minutes.

This membrane (three inch diameter circle) is mounted in a standard cell. There is admitted to the cell and to the non-porous separating layer a charge containing one part by weight of dewaxed SNO-100 oil, one part of methyl ethyl ketone, and one part of toluene. Feed is at 25° C. at 800 psig at flow rate of 1200 ml/min.

Separation is carried out at a charge (and retentate) pressure of about 800 psig. Permeate pressure is atmospheric. Selectivity is measured and reported as % Rejection which is calculated as 100 ×(the quantity of dewaxed oil in the feed minus the quantity of dewaxed oil in the permeate) divided by the quantity of dewaxed oil in the feed. Clearly a higher selectivity is desired, as this means that the retentate desirably contains less dewaxing solvent and the permeate desirably contains more solvent. Flux is measured as kilograms per square meter per hour (kmh).

In this example of the best mode presently known of carrying out the process of this invention, the Selectivity is 87.2% rejection and the Flux is 58.3 kmh.

Examples II–III

In this series of Examples, the procedure of Example I is followed except that the temperature of curing (i.e. the temperature of thermal cross-linking) is varied.

TABLE

| Example | Curing Temp °C. | Performance | |
|---|---|---|---|
| | | Selectivity % Rejection | Flux kmh |
| I | 125 | 87.2 | 58.3 |
| II | 110 | 72.6 | 57.8 |
| III | 150 | 86.4 | 44.1 |

From the above Table, it is apparent that although satisfactory results (in terms of Selectivity and Flux) are obtained in all three Examples, best results are attained in Example I which effects curing/thermal cross-linking at the preferred temperature of 125° C.

Examples IV–V

In this series of Examples, the procedure of Examples I–III is followed except that the original 10w% solution of poly terpene in hexane also contained 2w% of benzoyl peroxide.

TABLE

| Example | Curing Temp °C. | Performance | |
|---|---|---|---|
| | | Selectivity % Rejection | Flux kmh |
| IV | 125 | 81.6 | 59.3 |
| V | 150 | 70.4 | 36.8 |

From the above Table, it is apparent that thermal curing gives better results when no benzoyl peroxide, free-radial initiator is present. Compare for example, Example V (which shown Selectivity of 70.4% and Flux of 36.8) with Example III (which shows Selectivity of 86.4% and Flux of 44.1)qt the same temperature (150° C.).

Results comparable to those of Example I may be obtained if the terpene is as follows:

TABLE

| Example | Terpene | Formula |
|---|---|---|
| VI | Isoprene | $C_5H_8$ |
| VII | Alpha-Farnesene | $C_{15}H_{24}$ |
| VIII | Squalene | $C_{30}H_{50}$ |
| IX | Ocimene | $C_{10}H_{16}$ |

Results comparable to those of Example I may be obtained if the functionalizing reagent is as follows:

| Example | Functionalizing Reagent |
|---|---|
| X | maleimide |
| XI | maleic acid |
| XII | maleic mono-amide |

-continued

| Example | Functionalizing Reagent |
|---|---|
| XIII | maleic di-amide |
| XIV | vinyl acetate |
| XV | methyl acrylate |
| XVI | acrylonitrile |
| XVII | allyl amine |

Although this invention has been illustrated by reference to specific embodiments, it will be apparent to those skilled in the art that various charges and modifications may be made which clearly fall within the scope of the invention.

What is claimed:

1. The process for treating a charge containing dewaxing solvent and dewaxed oil which comprises
    passing said charge containing dewaxing solvent and dewaxed oil into contact with, as separating elastomer membrane, a non-porous separating membrane layer of an adduct of (i) a poly(aliphatic terpene) of $\overline{M}_n$ of 400–40,000 and (ii) as functionalizing reagent, a compound containing an ethylenically unsaturated double bond and a hydrophilic group, the so-functionalized membrane layer being thereafter thermally cross-linked at 110° C.–150°C.
    maintaining a pressure drop across said membrane thereby forming a high pressure retentate containing increased content of dewaxed oil and decreased content of dewaxing solvent and a low pressure permeate containing increased content of dewaxing solvent and decreased content of dewaxed oil;
    maintaining the pressure on the low pressure discharge side of said membrane above the vapor pressure of said permeate thereby maintaining said permeate in liquid phase;
    maintaining the pressure on the high pressure retentate side of said membrane above the vapor pressure of said charge containing dewaxing solvent and dewaxed oil and sufficient to drive permeate across said membrane thereby maintaining said charge dewaxing solvent and dewaxed oil and said retentate in liquid phase;
    recovering said permeate containing increased content of dewaxing solvent and decreased content of dewaxed oil; and
    recovering said retentate containing increased content of dewaxed oil and decrease content of dewaxing solvent.

2. The process for treating a charge containing solvent and dewaxed oil as claimed in claim 1 wherein said aliphatic terpene is a monoterpene.

3. The process for treating a charge containing solvent and dewaxed oil as claimed in claim 1 wherein said aliphatic terpene is alloöcimene.

4. The process for treating a charge containing solvent and dewaxed oil as claimed in claim 1 wherein said functionalizing reagent bears as a hydrophilic group, a —COOH, —CONH$_2$ —CN, —NH$_2$, acid anhydride, or imide group.

5. The process for treating a charge containing solvent and dewaxed oil as claimed in claim 1 wherein said functionalizing reagent bears an acid anhydride group as a hydrophilic group.

6. The process for treating a charge containing solvent and dewaxed oil as claimed in claim 1 wherein said functionalizing reagent is maleic acid anhydride.

7. The process for treating a charge containing solvent and dewaxed oil as claimed in claim 1 wherein thermal cross-linking is carried out at 120° C.-130° C. for 10-20 minutes.

8. The process for treating a charge containing solvent and dewaxed oil as claimed in claim 1 wherein said poly (aliphatic terpene) membrane is of molecular weight $\overline{M}_n$ of 400-4,000.

9. The process for treating a charge containing solvent and dewaxed oil which comprises passing said charge containing dewaxing solvent and dewaxed oil into contact with, as separating elastomer membrane, a non-porous separating membrane layer of an adduct of (i) a poly(alloöcimene) of $\overline{M}_n$ of 400-4,000, and (ii) as functionalizing reagent, maleic acid anhydride, the so-functionalized membrane layer being thereafter thermally cross-linked at 120° C.-130° C.;

maintaining a pressure drop across said membrane thereby forming a high pressure retentate containing increased content of dewaxed oil and decreased content of dewaxing solvent and a low pressure permeate containing increased content of dewaxing solvent and decreased content of dewaxed oil;

maintaining the pressure on the low pressure discharge side of said membrane above the vapor pressure of said permeate thereby maintaining said permeate in liquid phase;

maintaining the pressure on the high pressure retentate side of said membrane above the vapor pressure of said charge containing dewaxing solvent and dewaxed oil and sufficient to drive permeate across said membrane thereby maintaining said charge dewaxing solvent and dewaxed oil and said retentate in liquid phase;

recovering said permeate containing increased content of dewaxing solvent and decreased content of dewaxed oil; and recovering said retentate containing increased content of dewaxed oil and decrease content of dewaxing solvent.

* * * * *